(12) United States Patent
Eastlake, III et al.

(10) Patent No.: US 11,438,268 B2
(45) Date of Patent: *Sep. 6, 2022

(54) SERVER-BASED LOCAL ADDRESS ASSIGNMENT PROTOCOL

(71) Applicant: Futurewei Technologies, Inc., Plano, TX (US)

(72) Inventors: Donald E. Eastlake, III, Milford, MA (US); Yan Zhuang, Nanjing (CN); Yizhou Li, Nanjing (CN)

(73) Assignee: Futurewei Technologies, Inc., Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/006,554

(22) Filed: Aug. 28, 2020

(65) Prior Publication Data

US 2020/0396160 A1 Dec. 17, 2020

Related U.S. Application Data

(63) Continuation of application No. 15/060,139, filed on Mar. 3, 2016, now Pat. No. 10,797,996.

(Continued)

(51) Int. Cl.
*H04L 45/74* (2022.01)
*H04L 45/741* (2022.01)
(Continued)

(52) U.S. Cl.
CPC .......... *H04L 45/74* (2013.01); *H04L 61/2038* (2013.01); *H04L 61/6022* (2013.01);
(Continued)

(58) Field of Classification Search
None
See application file for complete search history.

(56) References Cited

U.S. PATENT DOCUMENTS

| | | | |
|---|---|---|---|
| 2003/0037163 A1* | 2/2003 | Kitada | H04L 61/6022 709/236 |
| 2004/0042446 A1 | 3/2004 | Koch et al. | |

(Continued)

FOREIGN PATENT DOCUMENTS

| | | |
|---|---|---|
| CN | 101600156 A | 12/2009 |
| CN | 101951417 A | 1/2011 |

(Continued)

OTHER PUBLICATIONS

"IEEE Standard for Local and Metropolitan Area Networks: Overview and Architecture," IEEE Standards Association, IEEE Computer Society, IEEE Std 802-2014 (Revision to IEEE Std 802-2001) 2014, 74 pages.

(Continued)

*Primary Examiner* — Sai Aung
(74) *Attorney, Agent, or Firm* — Conley Rose, P.C.

(57) ABSTRACT

An apparatus comprises: a memory; and a processor coupled to the memory and configured to: perform a random number generation; generate a host identifier (HID) based on the random number generation, wherein the HID is substantially unique within a local network; and generate, using the HID, an initial message requesting a local address. A method comprises: performing a random number generation; generating a host identifier (HID) based on the random number generation, wherein the HID is substantially unique within a local network; generating, using the HID, an initial message requesting a local address; and transmitting the initial message.

20 Claims, 8 Drawing Sheets

Related U.S. Application Data

(60) Provisional application No. 62/129,251, filed on Mar. 6, 2015.

(51) Int. Cl.
    *H04L 65/611*     (2022.01)
    *H04L 61/5038*     (2022.01)
    *H04L 101/622*     (2022.01)
    *H04L 61/5053*     (2022.01)
    *H04L 61/5092*     (2022.01)

(52) U.S. Cl.
    CPC ...... *H04L 65/4076* (2013.01); *H04L 61/2053* (2013.01); *H04L 61/2092* (2013.01)

(56) References Cited

U.S. PATENT DOCUMENTS

| | | | |
|---|---|---|---|
| 2004/0205235 A1* | 10/2004 | Matsuhira | H04L 61/2038 709/238 |
| 2004/0205245 A1* | 10/2004 | Le Pennec | H04L 61/2578 709/245 |
| 2007/0195729 A1 | 8/2007 | Li et al. | |
| 2007/0237159 A1* | 10/2007 | Yamada | H04L 29/12594 370/395.53 |
| 2012/0110183 A1 | 5/2012 | Miranda et al. | |
| 2012/0311660 A1* | 12/2012 | Park | H04L 63/104 726/1 |
| 2014/0092901 A1 | 4/2014 | Kapadia et al. | |
| 2016/0094444 A1* | 3/2016 | MeLampy | H04L 67/2814 370/392 |

FOREIGN PATENT DOCUMENTS

| | | |
|---|---|---|
| CN | 102340555 A | 2/2012 |
| CN | 103581356 A | 2/2014 |
| CN | 104079686 A | 10/2014 |
| WO | 2014108175 A1 | 7/2014 |

OTHER PUBLICATIONS

"Standard for Local and Metropolitan Area Networks: Overview and Architecture—Draft Amendment: Local Medium Access Control (MAC) Address Usage," IEEE P802c/D0.2, Feb. 2016, 19 pages.

"Standard for Local and Metropolitan Area Networks: Overview and Architecture—Draft Amendment: Local Medium Access Control (MAC) Address Usage," IEEE P802c/D0.1, Nov. 2015, 21 pages.

Droms, "Dynamic Host Configuration Protocol," RFC 2131, Mar. 1997, 45 pages.

Droms, Ed., et al., "Dynamic Host Configuration Protocol for IPv6 (DHCPv6)," RFC 3315, Jul. 2003, 101 pages.

Eastlake, III, et al., "Randomness Requirements for Security," RFC 4086, Jun. 2005, 48 pages.

\* cited by examiner

SERVER-BASED LOCAL ADDRESS ASSIGNMENT PROTOCOL

CROSS-REFERENCE TO RELATED APPLICATIONS

This is a continuation of U.S. patent application Ser. No. 15/060,139 filed on Mar. 3, 2016, which claims priority to U.S. Prov. Patent App. No. 62/129,251 filed on Mar. 6, 2015, both of which are incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Manufacturers of traditional hardware network components such as servers, proxies, and clients request and receive media access control (MAC) addresses from a registration authority (RA) such as the Institute for Electrical and Electronics Engineers (IEEE) Standards Association Registration Authority. MAC addresses are also referred to as physical addresses. MAC addresses are typically meant to provide unique addresses for each node in a local area network (LAN), but MAC addresses are also globally unique identifiers (IDs). The original IEEE MAC address standard provides over 281 trillion unique MAC addresses.

Virtual machines (VMs) are software implementations of hardware machines that execute programs like hardware machines. VMs do not have physical MAC addresses because they are virtual, but it may be desirable to assign MAC addresses to VMs. The Internet of Things (IoT) is the network of physical devices, which have embedded sensors and network connectivity that enable those devices to exchange data. It may also be desirable to assign MAC addresses to IoT devices. However, IoT components are quickly proliferating, so there will not be a sufficient number of unique MAC addresses to accommodate the expected number of IoT devices. Therefore, there remains a need to provide MAC addresses to both VMs and IoT devices in a sustainable manner.

SUMMARY

In one embodiment, the disclosure includes an apparatus comprising: a memory; and a processor coupled to the memory and configured to: perform a random number generation; generate a host identifier (HID) based on the random number generation, wherein the HID is substantially unique within a local network; and generate, using the HID, an initial message requesting a local address. In some embodiments, wherein the apparatus is an endpoint client in the local network; the HID comprises a number of bits, and wherein the number guarantees within a probability that the HID is unique within the local network; the HID is at least 48 bits; the initial message comprises a destination media access control (DMAC) field, a source media access control (SMAC) field, an EtherType field, a server local address assignment protocol (S-LAAP) type field, and an HID field; wherein the DMAC field comprises a multicast address, the SMAC field comprises a first value indicating that the local address is unknown, the EtherType field comprises two octets indicating an S-LAAP protocol, the S-LAAP type field comprises a second value indicating that the initial message is an initial message type, and the HID field comprises the HID; wherein the processor is further configured to select, from among a plurality of response messages originating from servers in response to the initial message, a first response message comprising the local address part and a media access control (MAC) address based on the local address part; wherein the processor is further configured to generate a confirmation message in response to the first response message, and wherein the confirmation message comprises a destination media access control (DMAC) field, a source media access control (SMAC) field, an EtherType field, a server local address assignment protocol (S-LAAP) type field, and an HID field; wherein the DMAC field comprises a multicast address, the SMAC field comprises the MAC address, the EtherType field comprises two octets indicating an S-LAAP protocol, the S-LAAP type field comprises a value indicating that the confirmation message is a confirmation message type, and the HID field comprises the HID; the apparatus further comprises a transmitter coupled to the processor and configured to transmit the initial message and the confirmation message to a proxy; the apparatus further comprises a transmitter coupled to the processor and configured to transmit the initial message and the confirmation message to an intermediate node.

In another embodiment, the disclosure includes a proxy comprising: a first port configured to receive an initial message from a client, wherein the initial message comprises a host identifier (HID) that substantially uniquely identifies the client within a local network; a processor coupled to the first port and configured to amend the initial message to create an amended initial message comprising a port value corresponding to the first port; and a transmitter coupled to the processor and configured to transmit the amended initial message to a server located outside the local network. In some embodiments, the amended initial message comprises a destination media access control (DMAC) field, a source media access control (SMAC) field, an EtherType field, a server local address assignment protocol (S-LAAP) type field, an HID field, and a port field; the DMAC field comprises a multicast address, the SMAC field comprises a proxy media access control (MAC) address, the EtherType field comprises two octets indicating an S-LAAP protocol, the S-LAAP type field comprises a value indicating that the initial message is an initial message type, the HID field comprises the HID, and the port field comprises the port value; the proxy further comprises a second port coupled to the processor and configured to receive a response message from the server, wherein the response message comprises a media access control (MAC) address for the client and the port value; the proxy is configured to transmit the response message to the client through the first port and in response to receiving the response message from the first server.

In yet another embodiment, the disclosure includes a method comprising: performing a random number generation; generating a host identifier (HID) based on the random number generation, wherein the HID is substantially unique within a local network; generating, using the HID, an initial message requesting a local address; and transmitting the initial message. In some embodiments, the generating the initial message comprises: generating a destination media access control (DMAC) field comprising a multicast address; generating a source media access control (SMAC) field comprising a first value indicating that the local address is unknown; generating an EtherType field comprising two octets indicating a server local address assignment protocol (S-LAAP) protocol; generating an S-LAAP type field comprising a second value indicating that the initial message is an initial message type; and generating an HID field comprising the HID; the method further comprises: receiving a response message originating in response to the initial message; selecting, based on at least one criterion, a first response message from among the response message; and extracting, from the first response message, a media access control (MAC) address; the method further comprises: generating, in response to the first response message, a confirmation message by: generating a destination media access control (DMAC) field comprising a multicast address; generating a source media access control (SMAC) field comprising the MAC address; generating an EtherType field comprising two octets indicating an S-LAAP protocol; generating a server local address assignment protocol (S-LAAP) type field comprising a value indicating that the confirmation message is a confirmation message type; and generating an HID field comprising the HID.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
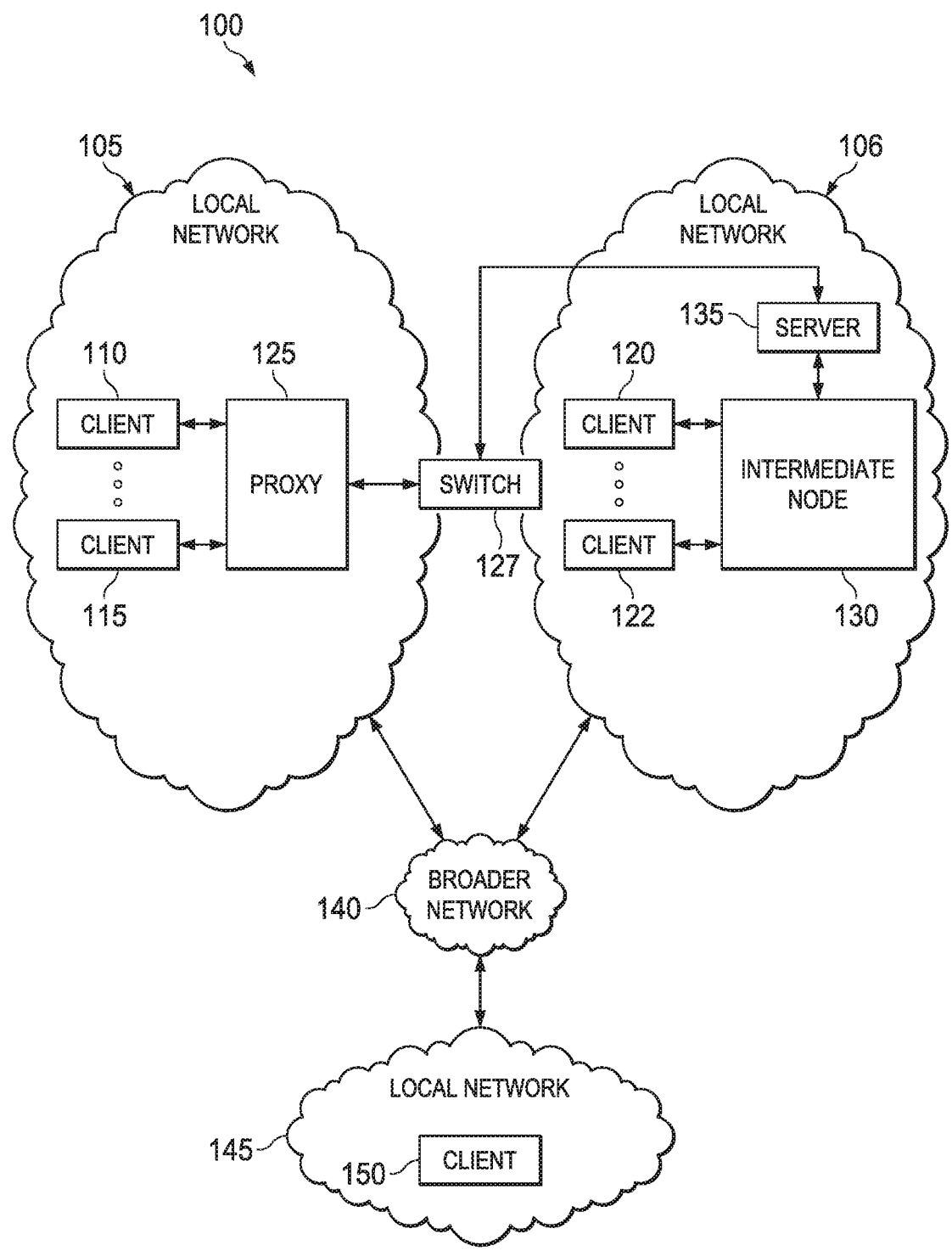
FIG. 1 is a schematic diagram of a system of networks according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

IEEE Std 802-2014, "IEEE Standard for Local and Metropolitan Area Networks: Overview and Architecture," Jun. 12, 2014, and IEEE P802c/D0.2, "Standard for Local and Metropolitan Area Networks: Overview and Architecture—Draft Amendment: Local Medium Access Control Address Usage, February 2016 (collectively, "IEEE 802"), which are incorporated by reference, describe an approach to address the issue of MAC addresses for VMs and IoT devices. Specifically, IEEE 802 describes MAC addresses with two portions, a globally assigned address part and a local address part. The RA still assigns the globally assigned address part to servers, but the servers can assign the local address part. For instance, a server in a LAN may use and re-use local addresses according to its own protocol. Thus, such protocols allow VMs and IoT components to obtain local addresses without having to request and receive those addresses from a centralized RA.

One such protocol is described in "Dynamic Host Configuration Protocol," Internet Engineering Task Force (IETF), March 1997, and "Dynamic Host Configuration Protocol for IPv6 (DHCPv6), IETF, July 2003 (collectively, "DHCP"), which are incorporated by reference. DHCP is a mature protocol that uses multicast messages, supports redundant servers, and supports proxies between clients and servers. However, VMs and IoT devices may not initially have MAC addresses. Thus, when they request local addresses or local IDs from servers, the servers cannot know which devices initiated the requests and the servers cannot individually address replies to the requesting devices with a message comprising the requested local addresses or local IDs.

Disclosed herein are embodiments for a server-based local address assignment protocol. The protocol may be referred to as server local address assignment protocol (S-LAAP, pronounced "ess-lap"). In S-LAAP, clients generate HIDs for themselves. The clients may be VMs and IoT devices. The HIDs have a very high probability of being locally unique IDs. Servers and other nodes do not generate the HIDs. Using the HIDs, the clients request local addresses from the servers. Thus, the clients do not need MAC addresses to request the local addresses from the servers. Either proxies or the servers record port information indicating which ports receive the requests, then respond to the requests using the same ports. Proxies may optionally not record the port information, but instead add the port information to the requests they forward to the servers. The servers then add that port information in their responses back to the proxies. The responses comprise MAC addresses and may include a length of time during which the requesting device can use the MAC address. The local addresses are locally unique. The response includes, or the servers may simultaneously transmit, layer 2 MAC addresses and may also include layer 3 Internet Protocol (IP) addresses. S-LAAP may be a new stand-alone standard or may be an extension of an existing standard such as IEEE 802 or DHCP.

FIG. 1 is a schematic diagram of a system 100 of networks according to an embodiment of the disclosure. The system 100 generally comprises a broader network 140 that couples local networks 105, 106, and 145. Though the system 100 is shown as comprising only the local networks 105, 106, and 145 coupled to the broader network 140, there may be any suitable number of local networks.

The local networks 105 and 106 are S-LAAP networks, meaning that they employ S-LAAP. The local networks 105 and 106 may each be referred to as a LAN. The local networks 105 and 106 are connected by a layer 3 switch 127. The local network 105 comprises clients 110 and 115 and a portion of the switch 127. The local network 106 comprises clients 120 and 121, an intermediate node 130; a portion of the switch 127; and a server 135. A proxy 125 may be in the local network 105 as shown or may be incorporated into and be a part of the switch 127. Though the local networks 105 and 106 are shown as comprising only those components, or nodes, there may be any suitable number of such nodes. In this context, the term "local" refers to a local network, which contrasts a broader network such as the broader network 140. A local network may refer to a group of nodes communicating at layer 2 or below of the Open Systems Interconnection (OSI) model, which contrasts a group of nodes communicating at layer 3 or above of the OSI model. Alternatively, a local network refers to a group of nodes that are geographically close to each other, for instance in the same building. In this context, a local network may mean that broadcast messages get to all end stations in the local network and multicast messages get to all end stations of interest.

The clients 110, 115, 120, and 122 are S-LAAP clients and are hardware network components, VMs, or IoT devices. The clients 110, 115, 120, and 122 are endpoints in the system 100 generally and the local networks 105 and 106 specifically. When the clients 110, 115, 120, and 122 are VMs, they may themselves be software, but may be implemented in a larger hardware device such as the proxy 125. When the clients 110, 115, 120, and 122 are IoT devices, they may communicate within the local networks 105 and 106 using a hardware network component such as the proxy 125. The clients 110 and 115 communicate with the server 135 via the proxy 125. The clients 120 and 122 communicate with the server 135 via the intermediate node 130.

The proxy 125 is a hardware network component or a software implementation in a hardware network component. If the clients 110, 115 are VMs, then the proxy 125 may comprise the clients 110, 115. Whether the clients 110, 115 are VMs or IoT devices, the proxy 125 provides a means for the clients 110, 115 to communicate within the local network 105. Specifically, the proxy 125 acts as a forwarding node for the clients 110, 115.

The intermediate node 130 may be similar to the client 110 and may represent a series of such nodes. Both the proxy 125 and the intermediate node 130 serve as an intermediary between the clients 110, 115, 120, and 122 on the one hand and the server 135 on the other hand. Thus, the proxy 125 and the intermediate node 130 provide a forwarding function to facilitate communication between the clients 110, 115, 120, and 122 on the one hand and the server 135 on the other hand. If an S-LAAP server and all clients are in the same local network, for instance the local network 106, then there may be no proxy.

The server 135 is an S-LAAP server and is a hardware network component or a software implementation of a hardware network component. For the other components in the local networks 105 and 106 that initially are without a MAC address, the server 135 enables access to the broader network 140. In contrast to the proxy 125, the server 135 maintains a database of resources for allocation comprising MAC addresses. Because the server 135 is a hardware network component or hosted within a hardware network component, it may have a MAC address assigned by an RA. The functions of the clients 110, 115, 120, and 122; the proxy 125; the intermediate node 130; and the server 135 are described further below.

The broader network 140 serves as an intermediary between the local networks 105 and 106 and the local network 145. For instance, the broader network 140 may be the Internet. In this context, the term "broader" refers to a broader network, which contrasts a local network such as the local networks 105, 106, and 145. A broader network may refer to a group of nodes communicating at layer 3 or above of the OSI model, which contrasts a group of nodes communicating at layer 2 or below of the OSI model. Alternatively, a broader network refers to a group of nodes that are geographically far from each other, for instance across a country or countries.

The local network 145 is similar to the local networks 105 and 106. The local network 145 may or may not be an S-LAAP network. The client 150 is similar to the clients 110, 115, 120, and 122. The client 150 may or may not be an S-LAAP client.

The system 100 is simplified in FIG. 1. Thus, the system 100 may comprise other components such as bridges, routers, and additional proxies and servers. In addition, the components of the system 100 may be arranged in any suitable manner. For instance, the server 135 may be co-located with a router.

Figure 2:
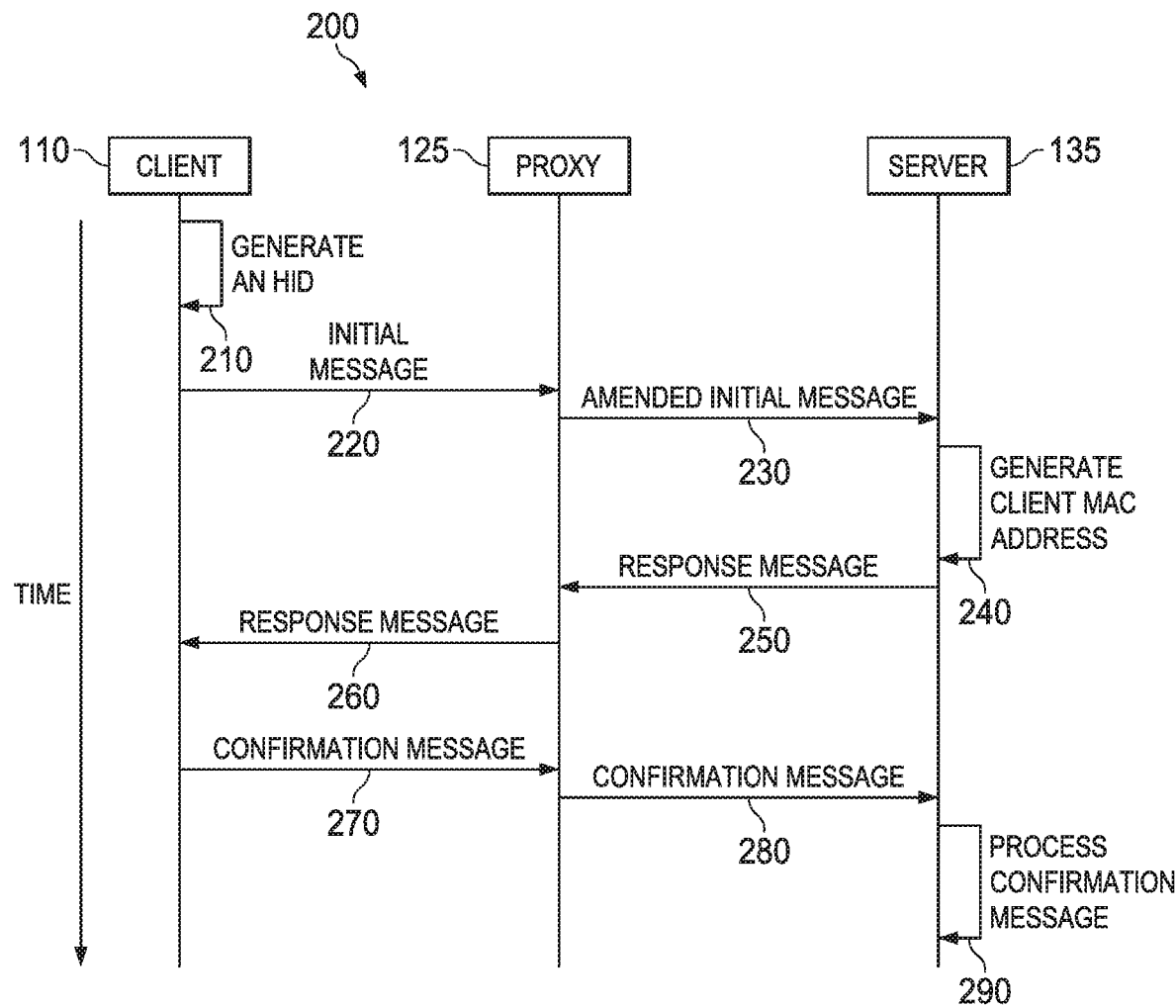
FIG. 2 is a message sequence diagram illustrating address assignment negotiation using a proxy according to an embodiment of the disclosure.

FIG. 2 is a message sequence diagram 200 illustrating address assignment negotiation using a proxy according to an embodiment of the disclosure. The proxy 125 and the server 135 implement the negotiation. Specifically, the diagram 200 shows negotiation among the client 110, the proxy 125, and the server 135. However, the same principles apply among any suitable components.

Before step 210, the client 110 desires to communicate with the client 150. In order to do so, the client 110 must have a MAC address. If the client 110 is a VM or an IoT device, the client 110 may not initially have a MAC address. In that case, the client 110 must obtain a MAC address from the server 135. However, as mentioned above, the server 135 may not have a way to recognize messages from or address messages to the client 110.

At step 210, the client 110 generates an HID. The client 110 does so using a random number generator to generate an HID that is suitably large, for example 48 or 64 bits. Some methods for generating such random numbers are given in "Randomness Requirements for Security," IETF RFC 4086, June 2005, which is incorporated by reference. Alternatively, the number of bits is chosen to guarantee within an acceptable probability that the HID is locally unique based on the number of nodes in the local network that might simultaneously generate HIDs. In that case, the HID is substantially unique. The probability is any suitable probability, for instance about 98 percent (%) or about 99% in 100 years of use. The HID need only be unique or substantially unique for a given period of time during which there is an outstanding S-LAAP request to which a response is pending, for instance, a portion of a second or several seconds.

At step 220, the client 110 generates an initial message, or packet or frame, and transmits the initial message to the proxy 125. The initial message is a multicast message or a broadcast message, so the local network delivers the initial message to other available nodes as well. The initial message in one embodiment is shown in FIG. 3.

Figure 3:
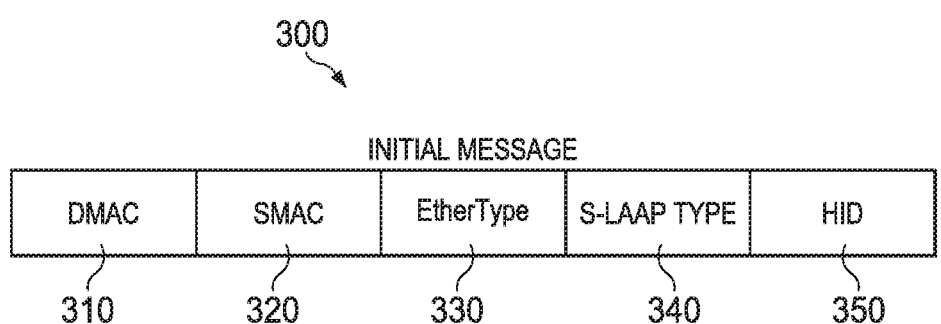
FIG. 3 is a schematic diagram of the initial message in FIG. 2.

FIG. 3 is a schematic diagram of the initial message 300 in FIG. 2. The initial message 300 is a multicast message or a broadcast message and comprises a destination MAC (DMAC) field 310, a source MAC (SMAC) field 320, an EtherType field 330, an S-LAAP type field 340, and an HID field 350. Collectively, multicast messages and broadcast messages may be referred to as groupcast messages. The fields in the initial message 300 are in any suitable order and comprise any suitable number of bits. The fields may conform to existing standards such as DHCP in order to extend such standards.

The DMAC field 310 comprises a destination address (DA). However, the client 110 may not know the address for the proxy 125 or any other nodes. Thus, the DA is a special multicast address or broadcast address, the latter of which may be all 1s.

The SMAC field 320 comprises a source address (SA). However, the client 110 may not have or know its client MAC address. Thus, the SA is a special value indicating that the MAC is not known and comprising, for instance, all 0s or all 1s. The special value indicates that the client 110 does not have or know its client MAC address.

The EtherType field 330 comprises either a new EtherType or a sub-type of an existing EtherType. An EtherType is a two-octet field used to indicate a protocol used for the initial message 300, indicate the size of the initial message 300, or both. In this case, the EtherType field 330 may comprise an assigned value that indicates S-LAAP. The S-LAAP type field 340 comprises a value indicating a type of S-LAAP message. In this case, the value indicates that the initial message 300 is an initial message. The HID field 350 comprises the HID that the client 110 generated at step 210 in FIG. 2.

The initial message 300 may comprise additional fields as well. For instance, the initial message comprises additional client information such as authentication, authority, certification, or other information. The authentication information may be the date and the time, a configuration string, security information, or billing information such as an account number. Security information may comprise one or more message authentication codes or digital signatures.

Returning to FIG. 2, at step 230, the proxy 125 receives the initial message 300, amends the initial message 300 to create an amended initial message 300', and transmits the amended initial message 300' to the server 135. Alternatively, the proxy 125 does not amend the initial message 300, but instead forwards the initial message 300 based on the DA in the DMAC field 310. In other words, the proxy 125 forwards the initial message 300 to multiple nodes since the DA is a special multicast address or the broadcast address. The proxy 125 is used because the initial message 300, which is a multicast message or a broadcast message, would otherwise have to flood a local network containing the server. The use of the proxy permits the flooding of the initial message 300 to be constrained to the local network 105 and not extend to flooding the local network 106, thus reducing network load while still providing service to clients in the local network 105.

Figure 4:
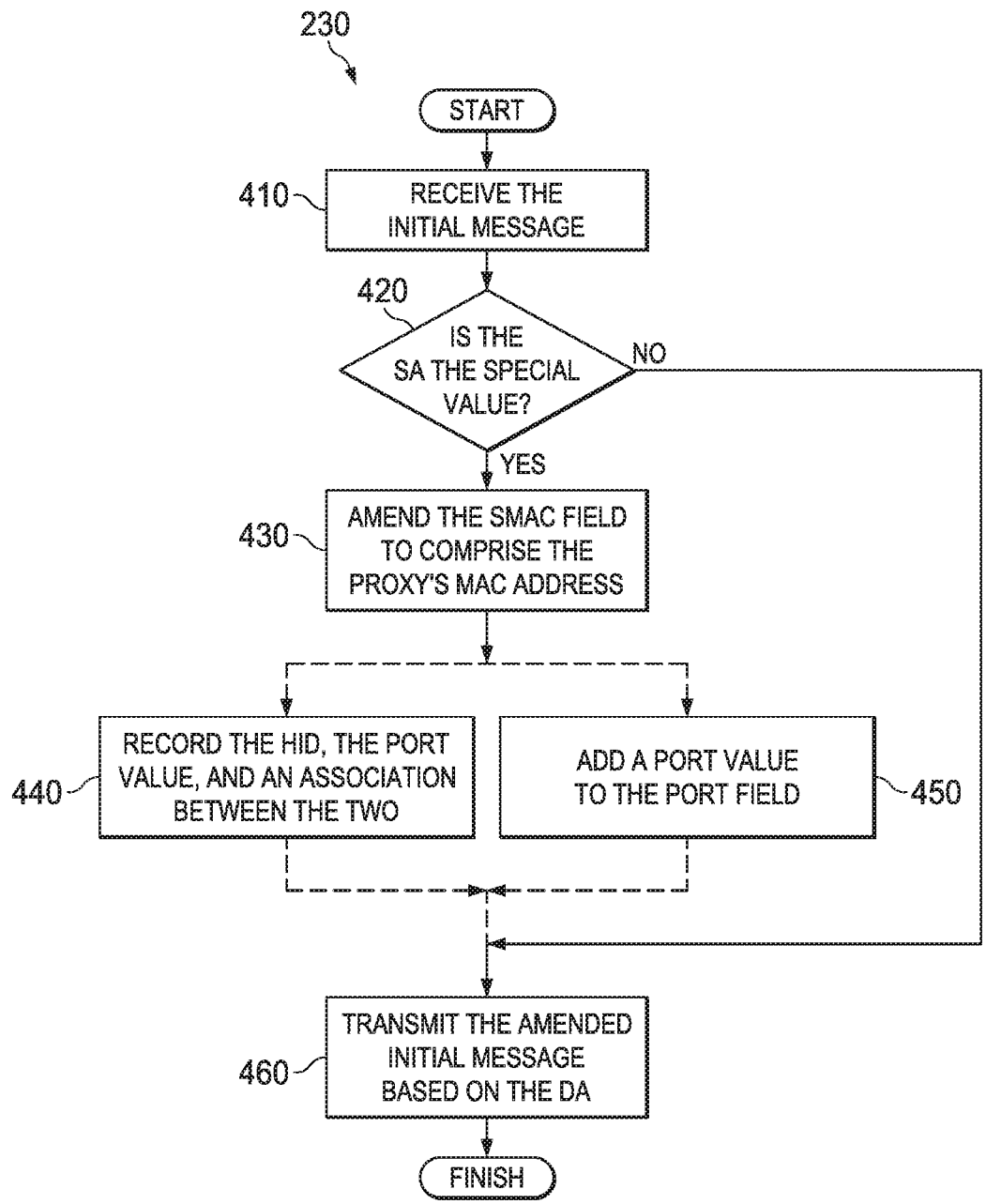
FIG. 4 is a flowchart illustrating step 230 in FIG. 2 in further detail.

FIG. 4 is a flowchart illustrating step 230 in FIG. 2 in further detail. At step 410, the proxy 125 receives the initial message 300. At decision diamond 420, the proxy 125 determines whether the SA from the SMAC field 320 is the special value, for instance all 0s or all 1s. If not, then the proxy 125 proceeds to step 460. If so, then the proxy 125 proceeds to step 430. At step 430, the proxy 125 amends the SMAC field 320 to comprise a proxy MAC address belonging to the proxy 125. After step 430, the proxy 125 determines based on a design choice whether to proceed to either step 440 or step 450. Alternatively, the proxy 125 completes neither step 440 nor step 450 or completes both step 440 and step 450. The dashed lines indicate this design choice.

At step 440, the proxy 125 records in a proxy look-up table the HID from the HID field 350, a port value indicating a port through which the proxy 125 received the initial message 300, and an HID-port association between the two. At step 450, the proxy 125 amends or adds a port field. Finally, at step 460, the proxy 125 transmits the amended initial message 300' based on the DA in the DMAC field 310. Specifically, the proxy 125 transmits the amended initial message 300' to multiple nodes, including the server 135, since the DA is a special multicast address. If the proxy 125 is in the local network 105 as shown in FIG. 1, then it transmits in a unicast manner the amended initial message 300' to one or more servers that are not in the local network 105. If the proxy 125 is in a node connecting the local network 105 to the local network 106, thus having direct access to both, it may leave the DMAC as a special multicast or the broadcast address and transmit the amended initial message 300' to the local network 106.

As can be seen, the amended initial message 300' is the same as the initial message 300, except for three possible differences. First, the SMAC field 320 may comprise the proxy MAC address. Second, a port field may comprise the port value. Third, the DMAC field 310 may be changed to a unicast address when directed to the server 135 and may be further changed when directed to any additional servers. Having the port value in a port field allows the proxy 125 to forgo storing the port value because the proxy 125 may again receive the port value as described at step 250 below. This allows the proxy 125 to minimize memory usage, or proxy state. Either storing the port value or subsequently receiving the port value allows the proxy 125 to narrow the number of potential clients to send messages to. For instance, if two clients generate the same HID, but the proxy 125 uses different ports for the clients, then the proxy 125 can still distinguish between the two clients.

Returning to FIG. 2, at step 240, the server 135 receives the amended initial message 300' and generates a client MAC address for the client 110. At step 250, the server 135 generates a response message and transmits the response message to the proxy 125.

Figure 5:
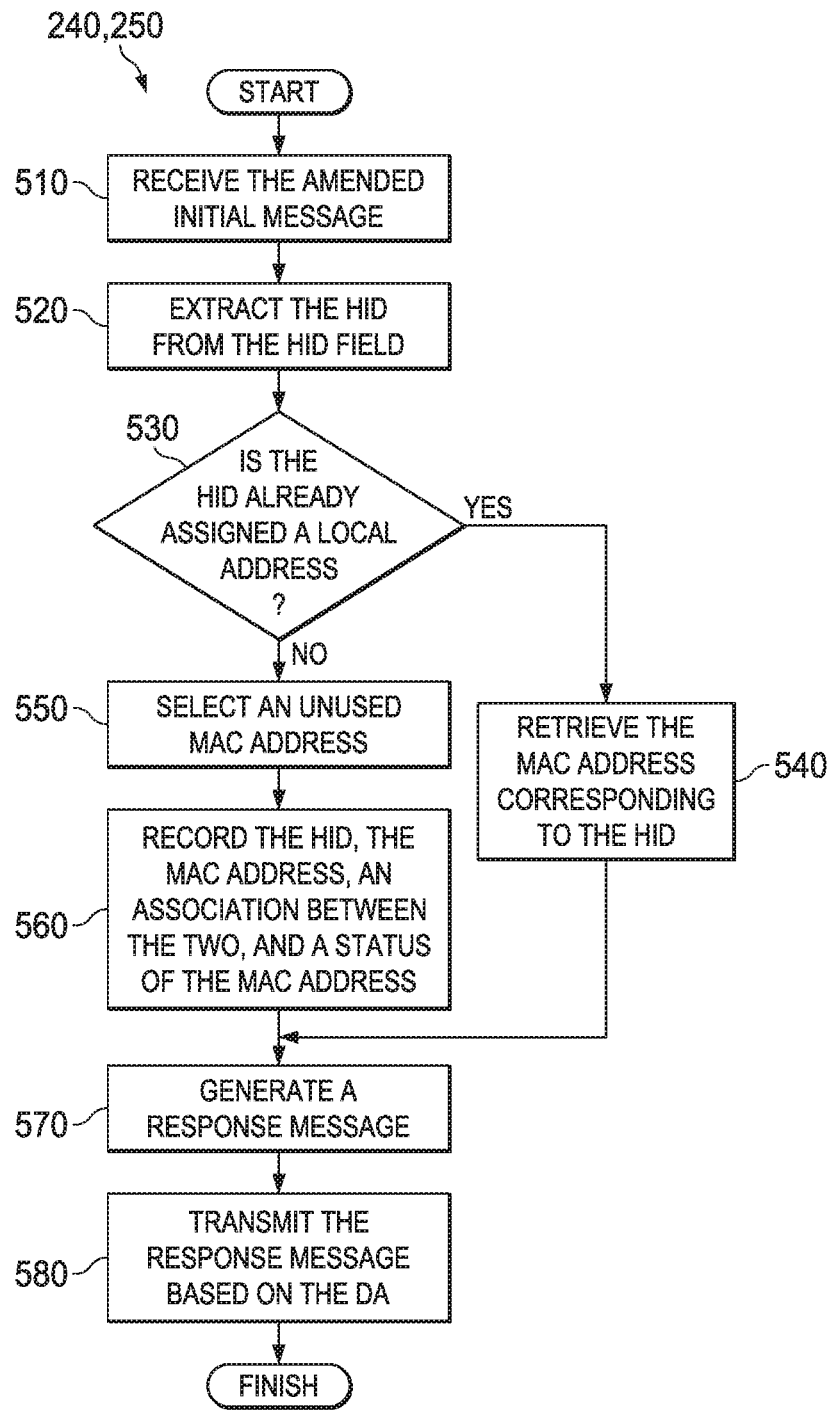
FIG. 5 is a flowchart illustrating steps 240 and 250 in FIG. 2 in further detail.

FIG. 5 is a flowchart illustrating steps 240 and 250 in FIG. 2 in further detail. At step 510, the server 135 receives the amended initial message 300'. At step 520, the server 135 extracts the HID from the HID field 350. The server 135 may also extract the additional client information if it is available in the amended initial message 300'.

At decision diamond 530, the server 135 scans a server look-up table to determine whether the HID is already assigned a MAC address. Alternatively, at decision diamond 530, the server 135 scans the server look-up table to determine whether the HID is already assigned a MAC address. If so, then the server 135 proceeds to step 540. If not, then the server 135 proceeds to step 550.

At step 540, the server 135 retrieves from the server look-up table the MAC address corresponding to the HID. The MAC address is locally unique. At step 550, the server 135 selects from the server look-up table an unused MAC address. The MAC address is locally unique. At step 560, the server 135 records in the server look-up table the HID, the MAC address, an association between the two, and a status of the MAC address. The status of the MAC address is that the MAC address is tentatively in use. The server 135 removes that status based on any suitable trigger such as a timer for a lease renewal.

At step 570, the server 135 generates a response message. The server 135 may include in the response message, or the server 135 may simultaneously transmit, a layer 2 MAC address or a layer 3 IP address. Finally, at step 580, the server 135 transmits the response message to the proxy 125 based on the DA in the DMAC field 310. If the proxy 125 is in a different local network than the server 135, as shown in FIG. 1, then the DA is a unicast address and the response message is a unicast message. If the proxy 125 is in the switch 127 and can be considered to be in the same local network 106 as the server 125, then the DA may is a multicast address and the response message is a multicast message. The disclosed embodiments attempt to use more unicast messages than multicast messages and broadcast messages because the latter two types of messages are more of a burden on the local networks 105 and 106.

The response message may be one of at least three types of response messages. A first type of response message indicates that the server 135 does not have MAC resources available. In that case, step 530 may proceed directly to step 570. A second type of response message indicates that the client 110 does not qualify for a MAC address. In that case, step 520 may proceed directly to step 570. A third type of response message indicates a client MAC address. The third type of response message is shown in FIG. 6.

Figure 6:
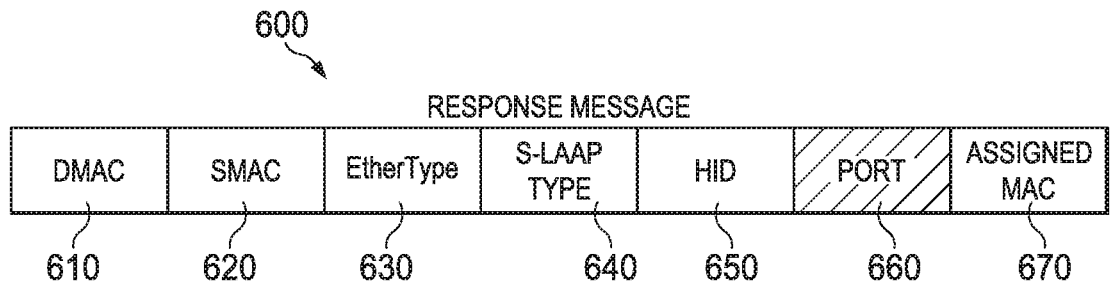
FIG. 6 is a schematic diagram of the response message in FIG. 2.

FIG. 6 is a schematic diagram of the response message 600 in FIG. 2. The response message 600 is a unicast message and comprises a DMAC field 610, an SMAC field 620, an EtherType field 630, an S-LAAP type field 640, an HID field 650, an optional port field 660, and an assigned MAC field 670. The fields in the response message 600 are in any suitable order and comprise any suitable number of bits. The fields may conform to existing standards such as DHCP in order to extend such standards. The response message 600 may comprise additional fields as well.

The DMAC field 610 comprises a DA that is the same as the proxy MAC address in the SMAC field 320 in the amended initial message 300' or a multicast DA. If the SMAC field 320 in the amended initial message 300' does not comprise the proxy MAC address, then the DA is one of two values. For a first value, the DA is a unicast DA. The proxy 125 recognizes the DA as such because the DA is not a special multicast address. For a second value, the DA is a special multicast address or the broadcast address. The SMAC field 620 comprises an SA that is a server MAC address belonging to the server 135.

The EtherType field 630 is typically the same as the EtherType field 330 in the initial message 300. The S-LAAP type field 640 comprises a value indicating a type of S-LAAP message. In this case, the value indicates that the response message 600 is a response message. The HID field 650 is the same as the HID field 350 in the initial message 300. The port field 660, if present, is the same as the port field 360 in the amended initial message 300'. The assigned MAC field 670 comprises the client MAC address that the server 135 generated for the client 110 at step 560 in FIG. 5.

Figure 7:
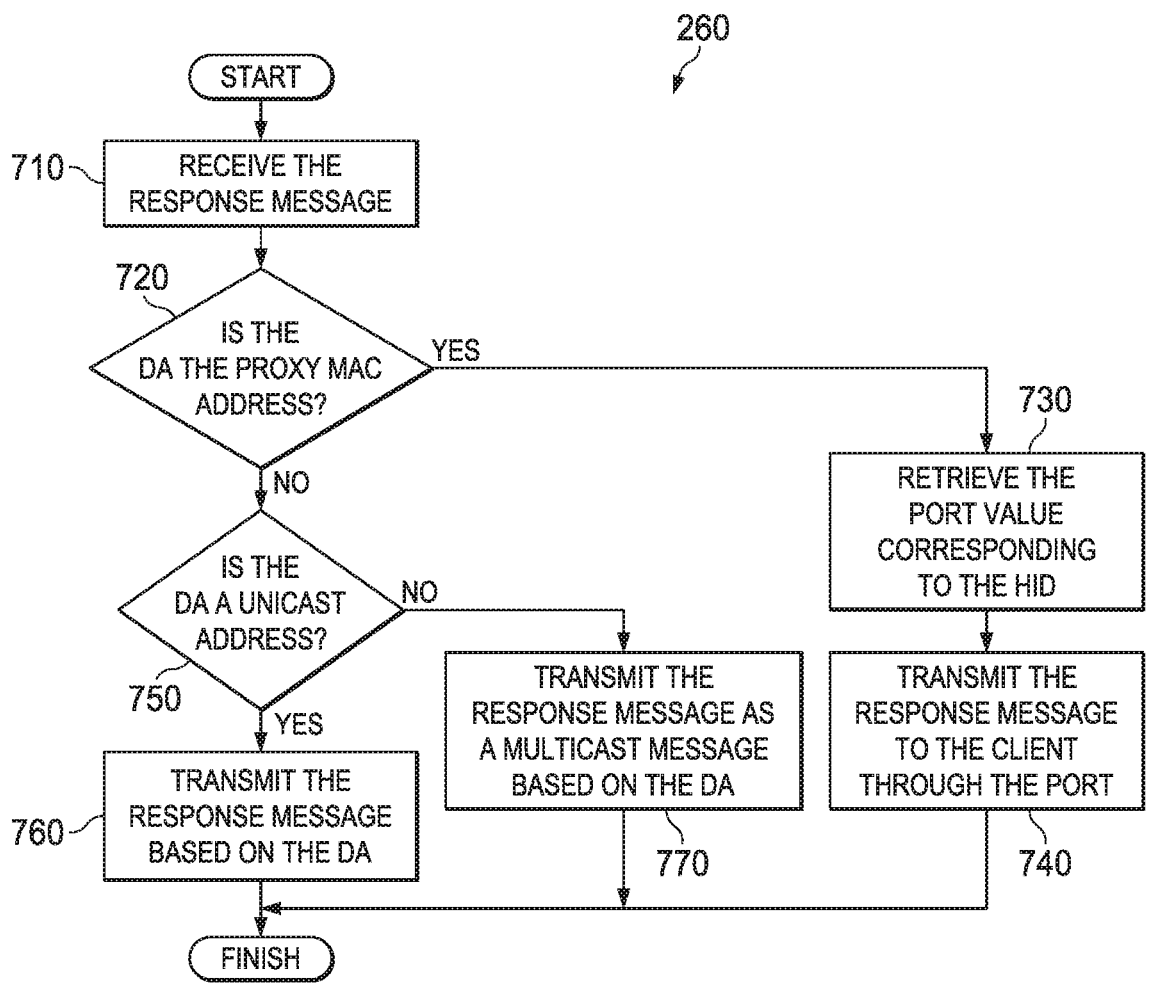
FIG. 7 is a flowchart illustrating step 260 in FIG. 2 in further detail.

Returning to FIG. 2, at step 260, the proxy 125 receives the response message 600 and transmits the response message 600 to the client 110. The proxy 125 may amend the response message 600. For instance, if the proxy 125 receives the response message 600 as a unicast message, then the proxy 125 may amend the response message 600 to create an amended response message 600'. The amended response message 600' amends the DMAC field 610 to comprise a special multicast address or the broadcast address as the client still does not know its MAC address, amends the SMAC field 620 to comprise a MAC address of a port through which the proxy 125 forwards the response message 600, and optionally removes the port field 660 as the client 110 need not know its contents. FIG. 7 is a flowchart illustrating step 260 in FIG. 2 in further detail. At step 710, the proxy 125 receives the response message 600. At decision diamond 720, the proxy 125 determines whether the DA from the DMAC field 610 is the proxy MAC address. If so, then the proxy 125 proceeds to step 730. If not, then the proxy 125 proceeds to decision diamond 750.

At step 730, the proxy 125 scans the proxy look-up table and retrieves the port value corresponding to the HID. Alternatively, instead of scanning the proxy look-up table, the proxy 125 determines the port value from the port field 660 if the port field 660 is available. The port value indicates a port through which the proxy 125 received the initial message 300. At step 740, the proxy 125 transmits the response message 600 to the client 110 through the port.

At decision diamond 750, the proxy 125 determines whether the DA from the DMAC field 610 is a unicast address. The proxy 125 does so by analyzing a groupcast bit in the DMAC field 610. If the groupcast bit is 0, then the DA is unicast. If the groupcast bit is 1, then the DA is groupcast. If the groupcast bit is 0, then the proxy 125 proceeds to step 760. If not, then the DA is a special multicast address and the proxy 125 proceeds to step 770. At step 760, the proxy 125 transmits the response message 600 based on the DA. Specifically, if the DA is the client MAC address, then the proxy 125 transmits the response message 600 to the client 110. At step 770, the proxy 125 transmits the response message 600 as a multicast message based on the DA. Specifically, the proxy 125 transmits the response message 600 to the client 110 and to other available nodes as well.

Returning to FIG. 2, at step 270, the client 110 receives the response message 600, generates a confirmation message, and transmits the confirmation message to the proxy 125. Because the initial message 300 is a multicast message or a broadcast message, the client 110 may receive multiple response messages 600 from multiple servers. The client 110 therefore selects one of the response messages 600 and selects the corresponding server to transmit a confirmation message to. The client 110 selects the response message 600 based on any suitable criterion or criteria. For instance, the client 110 selects the first response message 600 that it receives or the response message 600 associated with a server that previously provided the best service. In this case, the server that the client 110 selects is the server 135.

The confirmation message is a multicast message or a broadcast message, so the client 110 transmits the confirmation message to other available nodes as well. Because the confirmation message is a multicast message or a broadcast message, all servers, including the server 135, will know either directly or via a proxy, that the client MAC address belonging to the client 110 is in use. In addition, all servers other than the server 135 will know that the client 110 rejected their response messages 600. The confirmation message is shown in FIG. 8.

Figure 8:
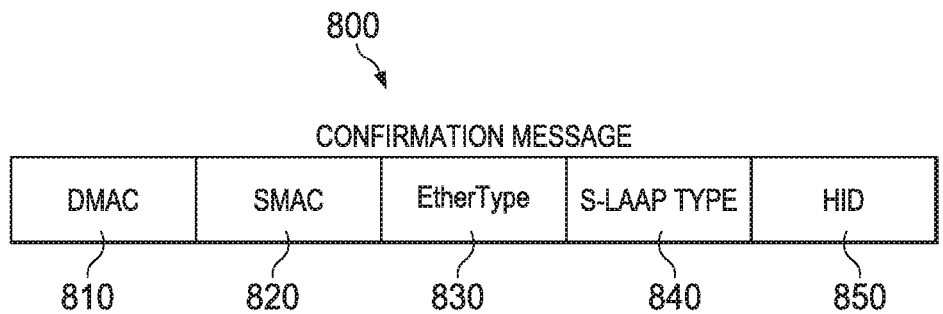
FIG. 8 is a schematic diagram of the confirmation message in FIG. 2.

FIG. 8 is a schematic diagram of the confirmation message 800 in FIG. 2. The confirmation message 800 is a multicast message or a broadcast message and comprises a DMAC field 810, an SMAC field 820, an EtherType field 830, an S-LAAP type field 840, and an HID field 850. The fields in the confirmation message 800 are in any suitable order and comprise any suitable number of bits. The fields may conform to existing standards such as DHCP in order to extend such standards. The response message 800 may comprise additional fields as well.

The DMAC field 810 is typically the same as the DMAC field 310 in the initial message 300. The SMAC field 820 is the same as the assigned MAC field 670 in the response message 600. The EtherType field 830 is typically the same as the EtherType field 330 in the initial message 300 and the EtherType field 630 in the response message 600. The S-LAAP type field 840 comprises a value indicating a type of S-LAAP message. In this case, the value indicates that the confirmation message 800 is a confirmation message. The HID field 850 is the same as the HID field 350 in the initial message 300 and the HID field 650 in the response message 600. Alternatively, the confirmation message 800 comprises another field from the response message 300 that is substantially unique within the local network.

Figure 9:
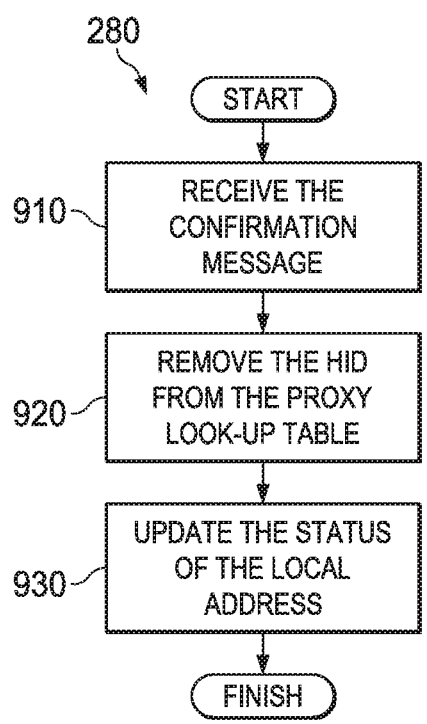
FIG. 9 is a flowchart illustrating step 280 in FIG. 2 in further detail.

Returning to FIG. 2, at step 280, the proxy 125 receives the confirmation message 800, processes the confirmation message 800, and transmits the confirmation message 800 to the server 135. FIG. 9 is a flowchart illustrating step 280 in FIG. 2 in further detail. At step 910, the proxy 125 receives the confirmation message 800. At step 920, the proxy 125 removes the HID from the proxy look-up table if the HID is still available in the proxy look-up table. Finally, at step 930, the proxy 125 forwards the confirmation message 800 based on the DA from the DMAC field 810. Specifically, the proxy 125 may forward the confirmation message 800 to multiple nodes, including the server 135, since the DA is a special multicast address or the broadcast address.

Figure 10:
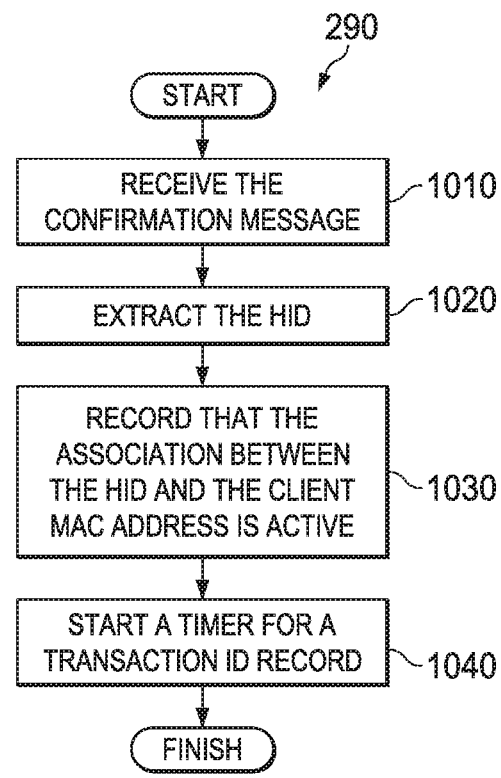
FIG. 10 is a flowchart illustrating step 290 in FIG. 2 in further detail.

Returning to FIG. 2, finally, at step 290, the server 135 receives and processes the confirmation message 800. FIG. 10 is a flowchart illustrating step 290 in FIG. 2 in further detail. At step 1010, the sever 135 receives the confirmation message 800. At step 1020, the server 135 extracts the HID from the HID field 850. At step 1030, the server 135 records in the server look-up table that the association between the HID and the client MAC address is active. The server 135 removes the active status based on any suitable trigger such as a timer for a lease renewal. Finally, at step 1040, the server 135 starts the timer for the association. If there are any other servers that offered a MAC address to the client 110, then, on receipt of the confirmation by the client 110 that the client 110 chose the MAC address offered by the server 135, the other servers mark the MAC address that they offered as available.

Figure 11:
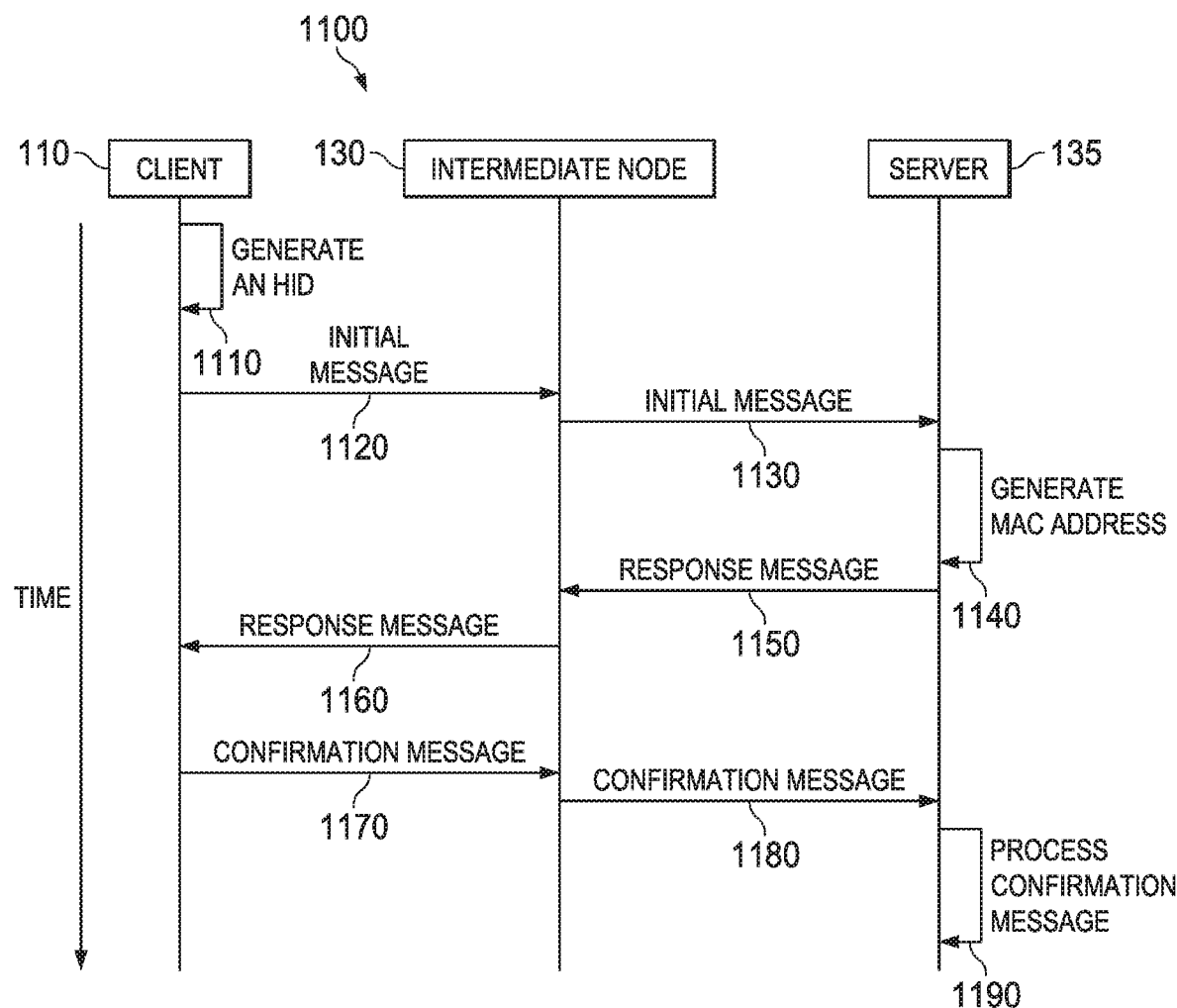
FIG. 11 is a message sequence diagram illustrating address assignment negotiation using an intermediate node according to an embodiment of the disclosure.

FIG. 11 is a message sequence diagram 1100 illustrating address assignment negotiation using an intermediate node according to an embodiment of the disclosure. The local network 106 implements the negotiation. Specifically, the diagram 1100 shows negotiation among the client 110, the intermediate node 130, and the server 135. However, the same principles apply among any suitable components.

The diagram 1100 includes steps 1110-1190, which are similar to the steps 210-290 in FIG. 2, respectively, except for at least two differences. First, the intermediate node 130 replaces the proxy 125. Second, at step 1150, the server 135 transmits the response message 600 as a multicast message. Thus, the DA in the DMAC field 610 is a special multicast address or the broadcast address. Similarly, the intermediate node 130 transmits the response message 600 as a multicast message. The DA for the two response messages 600 may be the same or different. Unlike for the address assignment negotiation using a proxy as shown in the message sequence diagram 200, the intermediate node does not amend messages, including the initial message 300, the response message 600, and the confirmation message 800.

Figure 12:
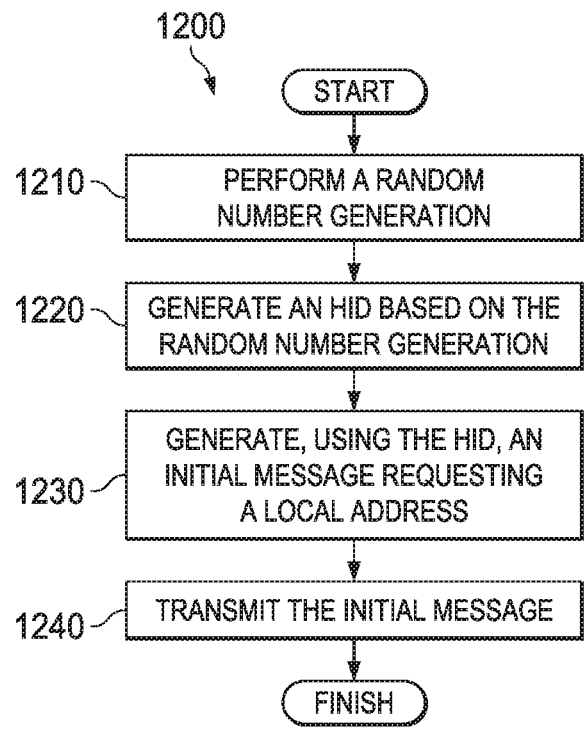
FIG. 12 is a flowchart illustrating a method of generating a host identifier (HID) and transmitting an initial message according to an embodiment of the disclosure.

FIG. 12 is a flowchart illustrating a method 1200 of generating an HID and transmitting an initial message according to an embodiment of the disclosure. One of the clients 110, 115, 120 may implement the method 1200 at any suitable time, for instance upon desiring to communicate with another node such as the client 150. The clients 110, 115, 120, as described below with respect to FIG. 13, comprise a processor implemented by any suitable combination of hardware, middleware, firmware, and software.

At step 1210, a random number generation is performed. At step 1220, an HID is generated based on the random number generation. Steps 1210 and 1220 may correspond to step 210 in FIG. 2. Specifically, at step 210, the client 110 generates an HID. The client 110 does so using a random number generator to generate an HID that is suitably large, for example 48 or 64 bits. Some methods for generating such random numbers are given in "Randomness Requirements for Security." Alternatively, the number of bits is chosen to guarantee within an acceptable probability that the HID is locally unique based on the number of nodes in the local network that might simultaneously generate HIDs. In that case, the HID is substantially unique. The probability is any suitable probability, for instance about 98% or about 99% in 100 years of use. The HID need only be unique or substantially unique for a given period of time during which there is an outstanding S-LAAP request to which a response is pending, for instance, a portion of a second or several seconds.

At step 1230, an initial message requesting a local address is generated using the HID. Finally, at step 1240, the initial message is transmitted. Steps 1230 and 1240 may correspond to step 220 in FIG. 2. Specifically, at step 220, the client 110 generates an initial message, or packet or frame, and transmits the initial message to the proxy 125. The initial message is a multicast message or a broadcast message, so the local network delivers the initial message to other available nodes as well. The initial message in one embodiment is shown in FIG. 3.

Figure 13:
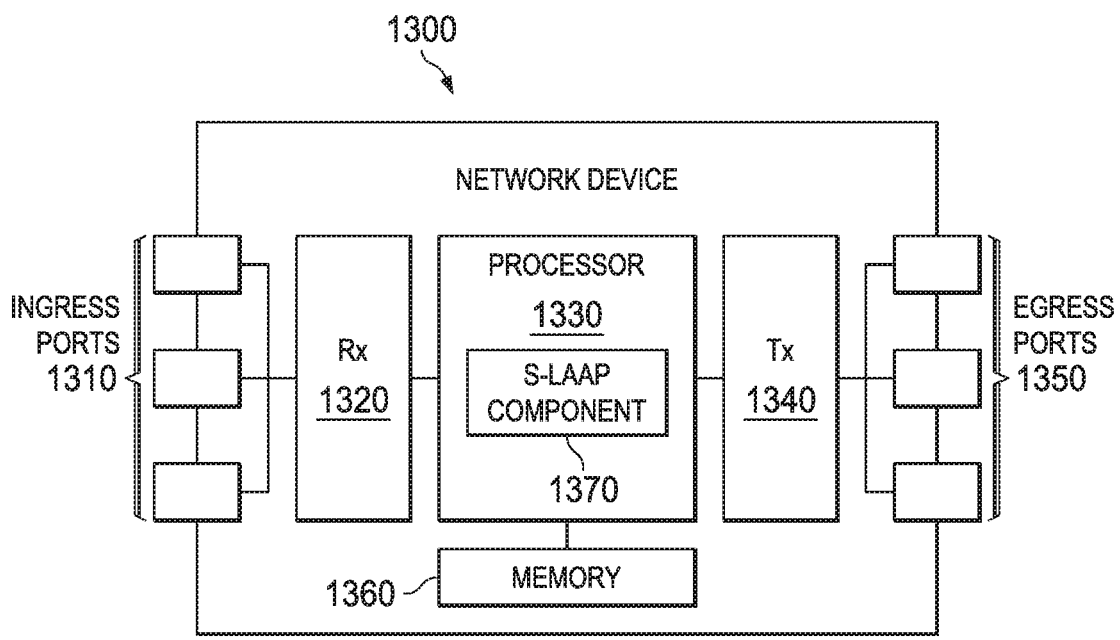
FIG. 13 is a schematic diagram of a network device according to an embodiment of the disclosure.

FIG. 13 is a schematic diagram of a network device 1300 according to an embodiment of the disclosure. The device 1300 is suitable for implementing the disclosed embodiments described above. The device 1300 comprises ingress ports 1310 and receiver units (Rx) 1320 for receiving data; a processor, logic unit, or central processing unit (CPU) 1330 to process the data; transmitter units (Tx) 1340 and egress ports 1350 for transmitting the data; and a memory 1360 for storing the data. The device 1300 may also comprise optical-to-electrical (OE) components and electrical-to-optical (EO) components coupled to the ingress ports 1310, the receiver units 1320, the transmitter units 1340, and the egress ports 1350 for egress or ingress of optical or electrical signals.

The processor 1330 is implemented by any suitable combination of hardware, middleware, firmware, and software. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is in communication with the ingress ports 1310, receiver units 1320, transmitter units 1340, egress ports 1350, and memory 1360. The processor 1330 comprises an S-LAAP component 1370. The S-LAAP component 1370 implements the disclosed embodiments described above. For instance, the S-LAAP component 1370 implements the clients 110, 115, 120; the proxy 125; the intermediate node 130; the server 135; and the message sequence diagrams 200, 1100 as described above. The inclusion of the S-LAAP component 1370 therefore provides a substantial improvement to the functionality of the device 1300 and effects a transformation of the device 1300 to a different state. Alternatively, the S-LAAP component 1370 is implemented as instructions stored in the memory 1360 and executed by the processor 1330.

The memory 1360 comprises one or more disks, tape drives, and solid-state drives and may be used as an overflow data storage device, to store programs when such programs are selected for execution, and to store instructions and data that are read during program execution. The memory 1360 may be volatile and non-volatile and may be read-only memory (ROM), random-access memory (RAM), ternary content-addressable memory (TCAM), and static random-access memory (SRAM).

The use of the term "about" means a range including ±10% of the subsequent number, unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A system for local address assignment, comprising:
    an endpoint client configured to:
        generate a host identifier (HID) based on a random number generation and independent of router input or server input, the HID being substantially unique within a local network; and
        transmit an initial message, the initial message including the HID and a request for a media access control (MAC) address for a local address; and
    a proxy in communication with the endpoint client, the proxy configured to:
        receive the initial message, the initial message accompanied by port information;
        forward the initial message;
        receive a response message in response to the initial message, the response message including a locally unique client MAC address; and
        forward the response message to the endpoint client.

2. The system of claim 1, the response message including a length of time during which the endpoint client can use the MAC address.

3. The system of claim 1, the response message including the port information.

4. The system of claim 1, the endpoint client is further configured to:
    receive a plurality of response messages; and
    select the response message from among the response messages and select a corresponding server.

5. The system of claim 1, the endpoint client is further configured to transmit a confirmation message to the proxy after receiving the response message.

6. The system of claim 5, the confirmation message including a destination MAC (DMAC) field, a source MAC (SMAC) field, an EtherType field, a server local address assignment protocol (S-LAAP) type field, and an HID field.

7. The system of claim 6, wherein the DMAC field comprises a multicast address, the SMAC field comprises the MAC address, the EtherType field comprises two octets indicating an S-LAAP protocol, the S-LAAP type field comprises a value indicating that the confirmation message is a confirmation message type, and the HID field comprises the HID.

8. The system of claim 1, wherein the initial message comprises a destination MAC (DMAC) field, a source MAC (SMAC) field, an EtherType field, a server local address assignment protocol (S-LAAP) type field, and an HID field.

9. The system of claim 8, wherein the DMAC field comprises a multicast address, the SMAC field comprises a first value indicating that the local address is unknown, the EtherType field comprises two octets indicating an S-LAAP protocol, the S-LAAP type field comprises a second value indicating that the initial message is an initial message type, and the HID field comprises the HID.

10. The system of claim 1, wherein the endpoint client is in the local network.

11. A method for local address assignment, comprising:
    generating, by an endpoint client, a host identifier (HID) based on a random number generation and independent of router input or server input, the HID being substantially unique within a local network;
    transmitting, by the endpoint client, an initial message, the initial message including the HID and a request for a media access control (MAC) address for a local address;
    receiving, by a proxy, the initial message, the initial message accompanied by port information;
    forwarding, by the proxy, the initial message;
    receiving, by the proxy, a response message in response to the initial message, the response message including a locally unique client MAC address; and
    forwarding, by the proxy, the response message to the endpoint client.

12. The method of claim 11, the response message including a length of time during which the endpoint client can use the MAC address.

13. The method of claim 11, the response message including the port information.

14. The method of claim 11, further comprising:
    receiving, by the endpoint client, a plurality of response messages; and
    selecting, by the endpoint client, the response message from among the response messages and selecting a corresponding server if the endpoint client receives more than one response message.

15. The method of claim 11, further comprising the endpoint client transmitting a confirmation message to the proxy after receiving the response message.

16. The method of claim 15, the confirmation message including a destination MAC (DMAC) field, a source MAC (SMAC) field, an EtherType field, a server local address assignment protocol (S-LAAP) type field, and an HID field.

17. The method of claim 16, wherein the DMAC field comprises a multicast address, the SMAC field comprises the MAC address, the EtherType field comprises two octets indicating an S-LAAP protocol, the S-LAAP type field comprises a value indicating that the confirmation message is a confirmation message type, and the HID field comprises the HID.

18. The method of claim 11, wherein the initial message comprises a destination MAC (DMAC) field, a source MAC (SMAC) field, an EtherType field, a server local address assignment protocol (S-LAAP) type field, and an HID field.

19. The method of claim 18, wherein the DMAC field comprises a multicast address, the SMAC field comprises a first value indicating that the local address is unknown, the EtherType field comprises two octets indicating an S-LAAP protocol, the S-LAAP type field comprises a second value indicating that the initial message is an initial message type, and the HID field comprises the HID.

20. The method of claim 11, wherein the endpoint client is in the local network.

* * * * *